United States Patent
Karapetkov et al.

(10) Patent No.: US 6,678,533 B1
(45) Date of Patent: Jan. 13, 2004

(54) METHOD FOR CONNECTING AN INCOMING CALL IN A WIRELESS TELECOMMUNICATIONS INSTALLATION TO A DUAL MODE TERMINAL

(75) Inventors: Stefan Karapetkov, Santa Clara, CA (US); Vincenzo Scotto Di Carlo, München (DE); Wilhelm Müller, Wörth (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/269,524
(22) PCT Filed: Sep. 24, 1997
(86) PCT No.: PCT/DE97/02173
§ 371 (c)(1),
(2), (4) Date: Mar. 29, 1999
(87) PCT Pub. No.: WO98/15137
PCT Pub. Date: Apr. 9, 1998

(30) Foreign Application Priority Data

Sep. 30, 1996 (DE) .......................... 196 40 287

(51) Int. Cl.[7] .................................. H04B 1/38
(52) U.S. Cl. .................... 455/552; 455/426; 455/462
(58) Field of Search ........................ 455/553, 554, 455/435, 456, 412, 416, 432, 445, 426, 462

(56) References Cited

U.S. PATENT DOCUMENTS

| | | | | |
|---|---|---|---|---|
| 5,490,284 A | * | 2/1996 | Itoh et al. | 455/11.1 |
| 5,890,064 A | * | 3/1999 | Widergen et al. | 455/445 |
| 5,924,030 A | * | 7/1999 | Rautola et al. | 455/426 |

FOREIGN PATENT DOCUMENTS

| | | | |
|---|---|---|---|
| DE | 43 43 335 A1 | | 6/1995 |
| FR | 2693863 | * | 5/1990 |
| FR | 2 693 863 | | 1/1994 |
| GB | 2225512 | * | 5/1990 |
| WO | WO 96/06498 | | 2/1996 |

* cited by examiner

Primary Examiner—Nay Maung
Assistant Examiner—Tilahun Gesesse
(74) Attorney, Agent, or Firm—Bell Boyd & Lloyd LLC

(57) ABSTRACT

A method for connecting a call coming into first wireless communication device to a terminal apparatus that can be operated as a wireless terminal apparatus of this wireless communication device and as a mobile radiotelephone terminal apparatus of a mobile radiotelephone network, under the precondition that the current availability of the terminal apparatus in the mobile radiotelephone network and/or in the wireless communication device is stored in both systems. It is checked whether there is present an item of information concerning the availability of the terminal apparatus via the mobile radiotelephone network and, if so, the call coming into the wireless communication device is forwarded to the terminal apparatus in the mobile radiotelephone network, if a delivery is not possible in the wireless communication device.

4 Claims, 1 Drawing Sheet

METHOD FOR CONNECTING AN INCOMING CALL IN A WIRELESS TELECOMMUNICATIONS INSTALLATION TO A DUAL MODE TERMINAL

BACKGROUND OF THE INVENTION

1. Field of the Invention

The present invention relates to a method for connecting an incoming call in a wireless communication device to a dual mode terminal apparatus that can be operated both as a wireless terminal apparatus of the wireless communication device and as a mobile radiotelephone terminal apparatus of a mobile radiotelephone network.

2. Description of the Prior Art

Such terminal apparatuses, called dual mode hand apparatuses (Dual Mode Handy) or dual mode terminal apparatuses, have recently been offered by some manufacturers. A dual mode terminal apparatus is a communication terminal apparatus provided with a transceiver unit and a coding/decoding unit for a mobile radiotelephone network, provided and with another transceiver unit and another coding/decoding unit for a stationary wireless communication system. As a mobile radiotelephone network, a network is typically provided according to the Global Standard for Mobile Radiotelephony GMS with approximately 0.9 GHz carrier frequency, or according to a standard DCS1800 with approximately 1.8 GHz carrier frequency. As a wireless communication system, a digital wireless communication system according to the ETSI standard for digital expanded wireless communication DECT (Digital Enhanced Cordless Telecommunication) is used. Such a terminal apparatus can be switched between the two operating modes (wireless operation or mobile radiotelephone operation), whereby among other things the dialing device and the electro-acoustic transducer of the terminal apparatus are used in both operating modes.

If an incoming call in the wireless communication device is to be connected to a dual mode terminal apparatus, the wireless terminal apparatus must be ready for operation within the radio area of the wireless communication device in wireless mode. If a subscriber wishes to receive a call coming in for the dual mode terminal apparatus in the wireless communication device at a different terminal apparatus or to receive it in mobile radiotelephone operation, in certain known communication networks, and particular in digital service-integrated communication networks, he can cause a call forwarding to this other terminal apparatus or to the same terminal apparatus via a different communication network. However, this is relatively expensive, so that many subscribers set up such a call forwarding only occasionally.

It is also possible to set up the wireless communication device with respect to a subscriber connection in such a way that when a call is coming in; in the wireless communication device, a prompter call is signaled for a certain period of time to the terminal apparatus for which the call is coming in, and a call forwarding is automatically carried out after this time period expires. This has the disadvantage that, within this certain time period, the called subscriber must accept an incoming call if he wants to prevent this call from being rerouted via the mobile radiotelephone network. A further disadvantage of such a procedure is that if a call coming in in the wireless communication device cannot be delivered within a certain time period, a signaling takes place for a connection set up between two different communication networks, independent of whether the subscriber can be reached in the mobile radiotelephone network or not. As such, the communication networks are unnecessarily burdened.

The object of the present invention is to device [. . . ] a method for connecting a call coming in in a wireless communication device to a terminal apparatus that can be operated both as a wireless terminal apparatus of this wireless communication means and also as a mobile radiotelephone terminal apparatus of a mobile radiotelephone network. In this way, unnecessary connection setup signalings between the wireless communication device and the mobile radiotelephone network are to be avoided as far as possible.

SUMMARY OF THE INVENTION

According to the present invention, therefore given current availability of the dual mode terminal apparatus in the mobile radiotelephone network, a message concerning such availability is sent to the wireless communication device, and an item of information concerning the availability of the terminal apparatus via the mobile radiotelephone network is stored in the wireless communication device. Given a call coming in for the terminal apparatus in the wireless communication device, it is checked within the wireless communication device whether an item of information is present relating to the availability of the terminal apparatus via the mobile radiotelephone network and, if the terminal apparatus can be reached via the mobile radiotelephone network, the incoming call in the wireless communication means is forwarded to the terminal apparatus in the radiotelephone network.

A development of the present invention addresses to the case in which the wireless communication device in which a call is coming in for a communication terminal apparatus is the home wireless communication device with relation to this terminal apparatus. As such, this terminal apparatus also can be operated at at least one further wireless communication device, i.e., is registered there. In a further development of the inventive method, the further wireless communication device sends a communication to the mobile radiotelephone network if the terminal apparatus can be reached in the area of this additional wireless communication device, and the mobile radiotelephone network communicates a message concerning the availability of the terminal apparatus to the home wireless communication device. If the mobile radiotelephone network has communicated an item of information concerning the availability of the terminal apparatus in the area of the additional wireless communication device to the home wireless communication device, the call is forwarded to the additional wireless communication device by the home wireless communication device.

In yet another development of this form of the inventive method, it is provided that a call is always forwarded from the home wireless communication device into the mobile radiotelephone network if a message concerning the availability of the terminal apparatus has been communicated from the mobile radiotelephone network to the home wireless communication device, and that the call forwarded from the home wireless communication device in the mobile radiotelephone network is forwarded from the mobile radiotelephone network to the additional wireless communication device, if there is present in the mobile radiotelephone network an item of information concerning the current availability of the terminal apparatus via this additional wireless communication device.

The last-named variant of the inventive method ensures that from the mobile radiotelephone network to the home wireless communication device it is always the case that only one message is required indicating that there is knowledge in the mobile radiotelephone network concerning the availability of the terminal apparatus. A message concerning the actual location of availability of the terminal apparatus then need be transmitted only from the corresponding wireless communication device to the mobile radiotelephone network.

Another development of the present invention provides that a call coming in for a communication terminal apparatus in the home wireless communication device is switched to a manually set forwarding destination given manually set call forwarding in this communication means.

The wireless communication device of the present invention contains a controller in order to automatically activate a call forwarding to the terminal apparatus in the mobile radiotelephone network upon receipt of an item of information concerning the availability of the terminal apparatus via the mobile radiotelephone network for this terminal apparatus such controller also deactivates such a call forwarding if the communication terminal apparatus has been detected as available within the wireless communication device.

Another wireless communication device of the present invention has a controller in order to automatically to activate a call forwarding to the terminal apparatus in the mobile radiotelephone network upon receipt of an item of information concerning the availability of a terminal apparatus via the mobile radiotelephone network for this terminal apparatus such controller also deactivates such a call forwarding if the item of information concerning the availability of the terminal apparatus via the mobile radiotelephone network is revised.

The first-named wireless communication device has the advantage that calls coming in for a terminal apparatus within the wireless communication device [. . . ] can always be received via the mobile radiotelephone network when the terminal apparatus cannot be reached via the wireless communication device but can be reached via the mobile radiotelephone network.

If, given the presence of a message concerning the availability of a terminal apparatus via the mobile radiotelephone network, a call forwarding is activated automatically and, in addition, a call forwarding to an additional wireless communication device is automatically activated, the availability of the terminal apparatus is ensured to a high degree, but the required signaling expense remains very low. Such is ensured within the mobile radiotelephone network, insofar as this additional wireless communication device is in possession of a communication concerning the availability of the terminal apparatus via this wireless communication device.

Additional features and advantages of the present invention are described in, and will be apparent from, the Detailed Description of the Preferred Embodiments and the Description of the Drawings.

DETAILED DESCRIPTION OF THE PREFERRED EMBODIMENTS

Figure 1:
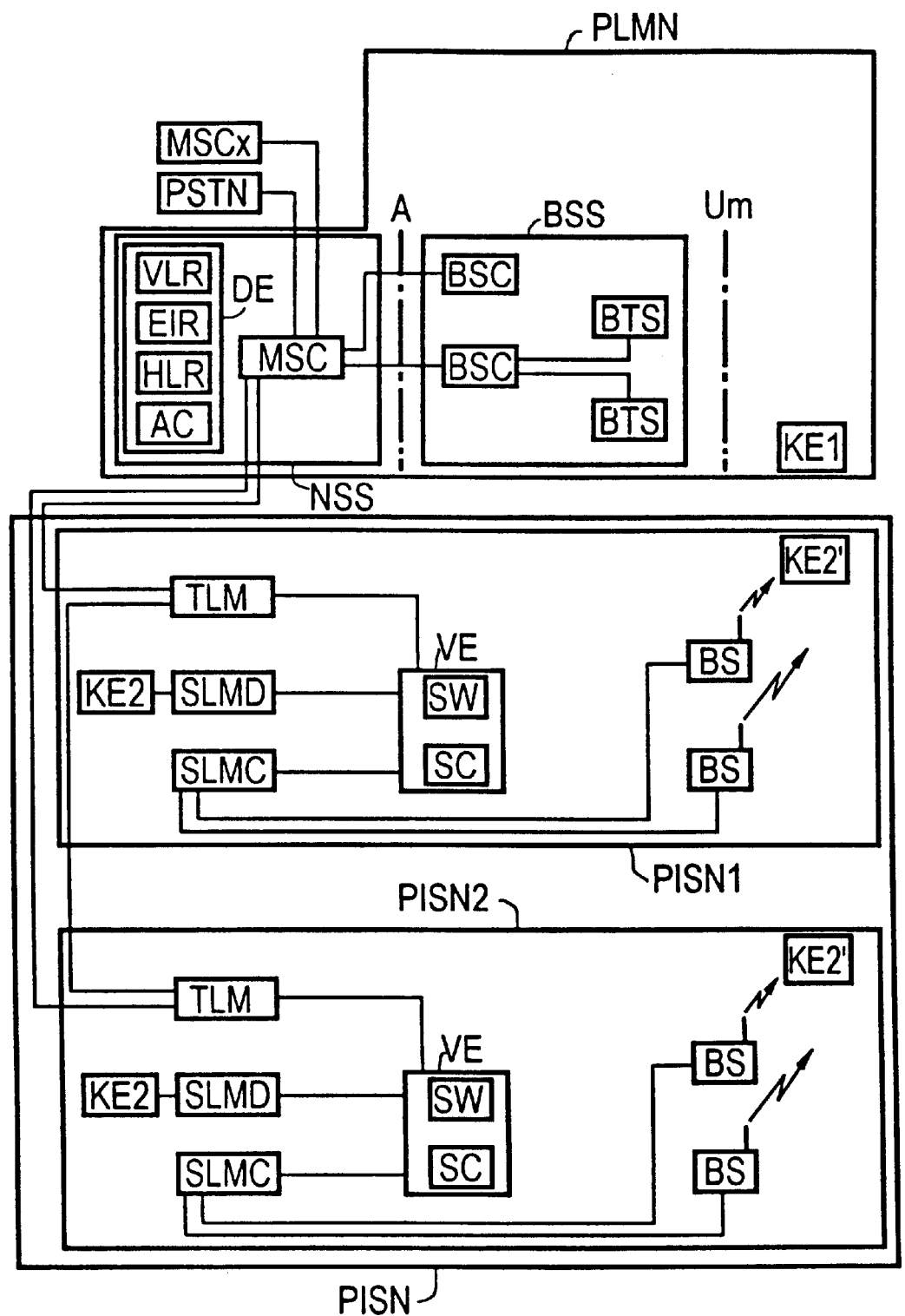
FIG. 1 shows a schematic representation of a block switching diagram of a network arrangement consisting of a mobile radiotelephone network, a public stationary network, and a private network consisting of two wireless communication device.

FIG. 1 shows a schematic representation of a block switching diagram of a mobile radiotelephone network PLMN with a network subsystem NSS for connection set up between at least one mobile subscriber and other subscribers for mobility management, and with a base station subsystem for controlling the radio connections with mobile stations. As an example, the FIG. 1 shows a mobile station as a communication terminal apparatus KE1.

The main unit of the network subsystem NSS is a mobile services switching center MSC, which communicates with base station control units BSC (Base Station Controller) via an A-interface. In the one base station subsystem BSS shown, a base station control unit BSC is provided that connects several base stations BTS with the mobile services switching center MSC as needed.

The mobile services switching center MSC serves as a standard switching node and, in addition, provides all functionalities required for handling mobile subscribers such as registration, authentication, updating of the location, call handover between base stations and call controlling to a subscriber registered as present in an area of a base station. The mobile services switching center MSC also provides connections to the public networks PSTN, and, in the example shown in FIG. 1, to another mobile services switching center MSCx, as well as to two wireless communication devices PISN1, PISN2 of a private network. A home location register HLR and a visitor location register VLR serve, together with the mobile services switching center MSC, for call controlling and for determining the location of subscriber terminal apparatuses in the mobile radiotelephone network.

Two additional registers of the network subsystem NSS, namely an equipment identity register EIR and an authentication register AC, are used for authentication and security purposes. The equipment identity register EIR contains a list of all mobile apparatuses permitted in the network, whereby each mobile station is identified by means of its international mobile equipment identification IMEI (International Mobile Equipment Identity). In the authentication center AC, copies of all secret keys respectively stored in the SIM card of each subscriber are stored, which are used for authentication and encryption via the radio channel.

Accordingly, there is present for every subscriber within the mobile radiotelephone network PLM a database allocated to such subscriber in which his authorizations, his location, and further information are stored in retrievable fashion.

The mobile services switching center MSC communicates with the registers HLR, VLR, AC and EIR, using a protocol referred to as MAP (Mobile Application Part Protocol). This standardized protocol MAP contains signaling functions that are required for the provision of services required in a mobile network.

In addition, the FIG. 1 shows two wireless communication devices PISN1, PISN2 of a private network, each having a switching device VE for the setup and teardown of connections between subscribers. The two wireless communication devices PISN1, PISN2 are hereby represented identically and are specified only once. The switching device VE contains a switching node SW and a switching control unit SC. The switching device VE can be connected with a public communication network PSTN and with the mobile services switching center MSC of the mobile radiotelephone network PLMN via a network line terminal module TPLM. The switching device VE can set up, via subscriber connection modules SLMD and SLMC, connections to communication terminal apparatuses KE2, KE2'. The subscriber terminal module for digital terminal apparatus SLMD, which module is shown as an example in FIG. 1, can be connected via a line with a communication terminal apparatus KE2. The wireless subscriber terminal module SLMC shown can be connected with a communication terminal apparatus KE2' via a base station BS and a radio path.

Also in FIG. 1, mobile terminal apparatuses KE1 and (twice) KE2' are shown according to their access possibilities in the individual networks. The physical realization of a terminal apparatus relevant for the present invention hereby provides, however, that both the terminal apparatus KE1 and a terminal apparatus KE2' according to the figure are contained in one apparatus.

Given current availability of this terminal apparatus KE1/KE2' in the mobile radiotelephone network, a message concerning this is communicated to the wireless communication device PISN1. In the wireless communication device PISN1 an item of information is stored concerning the availability of the terminal apparatus KE1/KE2' via the mobile radiotelephone network PLMN.

Given current availability of this terminal apparatus KE1/KE2' via the wireless communication device PISN1 or, respectively, PISN2, a message concerning this is communicated to the mobile radiotelephone network PLMN, and an item of information concerning the wireless communication device PISN1 or, respectively, PISN2 via which the terminal apparatus KE1/KE2' can be reached is stored in the mobile radiotelephone network PLMN.

For the connection of a call coming in in the first wireless communication device PISN1 to this terminal apparatus KE1/KE2', which can be operated both as a wireless terminal apparatus KE2' of this wireless communication device PISN1 and as a mobile radiotelephone terminal apparatus KE1 of the mobile radiotelephone network PLMN, it is checked whether there is present an item of information concerning the availability of the terminal apparatus KE1/KE2' via the mobile radiotelephone network PLMN. If this is the case, the call coming in in the wireless communication device PISN1 is forwarded to the terminal apparatus KE1 in the mobile radiotelephone network PLMN, insofar as the call cannot be delivered in the wireless communication device PISN1.

If the wireless communication device PISN1 in which a call is coming in for the communication terminal apparatus KE1/KE2' is the home wireless communication device in relation to this terminal apparatus KE1/KE2', and the terminal apparatus KE1/KE2' can in addition be operated at at least one additional wireless communication device PISN2 the call is forwarded from the home wireless communication device PISN1 to the additional wireless communication device PISN2. The above occurs under the condition that the mobile radiotelephone network PLMN communicates a message to the home wireless communication device PISN1 concerning the availability of the terminal apparatus KE1/KE2' via the mobile radiotelephone network and there is present in the mobile radiotelephone network an item of information concerning the current availability of the terminal apparatus KE1/KE2'. It also occurs only, insofar as there is present in the mobile radiotelephone network an item of information concerning the current availability of the terminal apparatus KE1/KE2' via the additional wireless communication device PISN2.

If an item of information concerning the current availability of the terminal apparatus in the mobile radiotelephone network is present in the home wireless communication device PISN1, the home wireless communication device PISN1 forwards the call coming into the mobile radiotelephone network PLMN, and the call forwarded into the mobile radiotelephone network PLMN is forwarded by the mobile radiotelephone network PLMN to the further wireless communication device PISN2, if there is present in the mobile radiotelephone network an item of information concerning the current availability of the terminal apparatus KE1/KE2' via the additional wireless communication device PISN2.

Although the present invention has been described with reference to specific embodiments, those of skill in the art will recognize that changes may be made thereto without departing from the spirit and scope of the invention as set forth in the hereafter appended claims.

We claim:

1. A method for connecting a call coming into a first wireless communication device to a terminal apparatus that can be operated both as a wireless terminal apparatus of the first wireless communication device and as a mobile radio telephone terminal apparatus of a mobile radio telephone network, the method comprising the steps of:

communicating, given current availability of the terminal apparatus in the mobile radio telephone network, a message concerning the current availability of the terminal apparatus to the first wireless communication device;

storing in the first wireless communication device an item of information concerning the current availability of the terminal apparatus in the mobile radio telephone network;

communicating, given the current availability of the terminal apparatus via the first wireless communication device, a message concerning the current availability of the terminal apparatus to the mobile radio telephone network;

storing an item of information concerning the first wireless communication device in which the terminal apparatus can be reached in the mobile radio telephone network;

checking whether an item of information concerning the current availability of the terminal apparatus via the mobile radio telephone network is stored in the first wireless communication device;

forwarding the call coming into the first wireless communication device to the mobile radio telephone network when the item of information concerning the current availability of the terminal apparatus in the mobile radio telephone network is stored in the first wireless communication device; and revising the stored information concerning the current availability of the wireless communication device if the terminal apparatus is detected as available within the first wireless communication device.

2. A method as claimed in claim 1, further comprising the steps of:

operating the first wireless communication device, in which a call is coming in for the communication terminal apparatus, at a second wireless communication device;

communicating a message from the mobile radio telephone network to the first wireless communication device concerning the current availability of the terminal apparatus via the mobile radio telephone network if an item of information is present in the mobile radio telephone network concerning the current availability of the terminal apparatus; and forwarding the call from the first wireless communication device to the second wireless communication device if an item of information is present in the mobile radio telephone network concerning the current availability of the terminal apparatus via the second wireless communication device.

3. A method as claimed in claim 2, wherein the first wireless communication device forwards the call coming into the mobile radio telephone network if an item of information is present in the first wireless communication device concerning the current availability of the terminal apparatus in the mobile radio telephone network, and wherein the call forwarded into the mobile radio telephone network is forwarded from the mobile radio telephone network to the second wireless communication device if an item of information is present in the mobile radio telephone network concerning the current availability of the terminal apparatus via the second communication device.

4. A method as claimed in claim 1, further comprising the step of:

switching a call coming in for the communication terminal apparatus to a manually set forwarding destination given manually set call forwarding.

* * * * *